(12) United States Patent
Kim

(10) Patent No.: US 9,331,546 B2
(45) Date of Patent: May 3, 2016

(54) IN-WHEEL MOTOR AND IN-WHEEL DRIVING DEVICE

(71) Applicant: HYUNDAI MOBIS CO., LTD., Seoul (KR)

(72) Inventor: Young Kwang Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 499 days.

(21) Appl. No.: 13/727,367

(22) Filed: Dec. 26, 2012

(65) Prior Publication Data

US 2014/0015382 A1 Jan. 16, 2014

(30) Foreign Application Priority Data

Jul. 12, 2012 (KR) .................. 10-2012-0076181

(51) Int. Cl.
*H02K 7/14* (2006.01)
*H02K 41/03* (2006.01)
*H02K 7/116* (2006.01)
*B60K 7/00* (2006.01)
*B60K 17/04* (2006.01)

(52) U.S. Cl.
CPC ............... *H02K 7/14* (2013.01); *H02K 41/031* (2013.01); *B60K 7/0007* (2013.01); *B60K 17/046* (2013.01); *B60K 2007/0038* (2013.01); *B60K 2007/0092* (2013.01); *H02K 7/116* (2013.01); *H02K 2201/15* (2013.01); *Y02T 10/641* (2013.01)

(58) Field of Classification Search
CPC ....... H02K 1/148; H02K 7/006; H02K 7/116; H02K 7/148; H02K 16/04; H02K 21/18; H02K 2201/15; H02K 7/102; H02K 41/031; B60K 7/00; B60K 7/0007

USPC ......................................................... 310/67 R
See application file for complete search history.

(56) References Cited

U.S. PATENT DOCUMENTS

| | | | | |
|---|---|---|---|---|
| 5,442,250 A | * | 8/1995 | Stridsberg | 310/186 |
| 5,465,802 A | * | 11/1995 | Yang | 180/65.51 |
| 5,616,977 A | * | 4/1997 | Hill | 310/179 |
| 7,306,065 B2 | * | 12/2007 | Nagaya | 180/65.51 |
| 7,528,518 B2 | * | 5/2009 | Maeda et al. | 310/67 R |
| 7,719,412 B2 | * | 5/2010 | Hattori et al. | 340/442 |
| 7,735,588 B2 | * | 6/2010 | Murata | 180/65.51 |
| 2004/0160033 A1 | * | 8/2004 | Kawamata et al. | 280/124.166 |
| 2004/0212259 A1 | * | 10/2004 | Gould | 310/67 R |
| 2006/0272871 A1 | * | 12/2006 | Murata | 180/65.5 |
| 2008/0070736 A1 | * | 3/2008 | Yoshino et al. | 475/149 |
| 2008/0078631 A1 | * | 4/2008 | Erlston et al. | 188/159 |

FOREIGN PATENT DOCUMENTS

| | | | | |
|---|---|---|---|---|
| JP | 2005337355 A | * | 12/2005 | F16D 55/224 |
| JP | 2012147645 A | * | 8/2012 | |
| KR | 10-2011-0040459 A | | 4/2011 | |

OTHER PUBLICATIONS

Eto et al., Machine Translation of JP2012147645, Aug. 2012.*

* cited by examiner

*Primary Examiner* — Quyen Leung
*Assistant Examiner* — Eric Johnson
(74) *Attorney, Agent, or Firm* — Knobbe Martens Olson & Bear LLP

(57) ABSTRACT

An in-wheel motor includes: a motor rotor installed inside a wheel of a vehicle; and a plurality of motor stators installed on the circumference of the motor rotor so as to be separated from each other, and forming magnetic fields to rotate the motor rotor.

22 Claims, 11 Drawing Sheets

IN-WHEEL MOTOR AND IN-WHEEL DRIVING DEVICE

CROSS-REFERENCES TO RELATED APPLICATIONS

The present application claims priority to Korean application number 10-2012-0076181, filed on Jul. 12, 2012, which is incorporated by reference in its entirety.

BACKGROUND OF THE INVENTION

The present invention relates to an in-wheel motor and an in-wheel driving device, and more particularly, to an in-wheel motor and an in-wheel driving device which may be efficiently mounted in a limited internal space of a wheel.

As fossil fuel is gradually exhausted, an electric vehicle to drive a motor using electric energy stored in a battery has been developed instead of a vehicle using fossil fuel such as gasoline or diesel.

The electric vehicle is divided into a pure electric vehicle to drive a motor using only electric energy stored in a rechargeable battery, a solar cell vehicle to drive a motor using a photoelectric cell, a fuel cell vehicle to drive a motor using a fuel cell which uses a hydrogen fuel, and a hybrid vehicle to drive an engine using fossil fuel and drive a motor using electricity.

In general, an in-wheel driving device is a technology used in a vehicle such an electric vehicle, which uses electricity as a power source. The in-wheel driving device directly transmits power to wheels through a motor disposed in two left and right driving wheels or four left/right and front/rear driving wheels, unlike a method for rotationally driving a wheel by transmitting power through an engine, a transmission, and a driving shaft in a gasoline or diesel vehicle.

The related art of the present invention is disclosed in Korean Patent Laid-open Publication No. 2011-0040459 published on Apr. 20, 2011 and titled "Wheel driving device for in-wheel system".

A conventional in-wheel motor has a cylindrical shape. Accordingly, a circular space is formed between a wheel and the motor.

The in-wheel motor must have such a size as to stably position a brake system and a suspension system in a space formed between the wheel and the in-wheel motor. Therefore, the in-wheel motor has a limitation in increasing an output.

In order to increase the output of the in-wheel motor, the size of the in-wheel motor must be increased. At this time, the size (depth) of the wheel must also be increased. When the size of the wheel is increased, an arm member of the suspension system may easily interfere with the wheel and may not be smoothly rotated. In particular, when the in-wheel motor is applied to a front wheel, the interference between the wheel and the suspension system additionally occurs.

SUMMARY OF THE INVENTION

Embodiments of the present invention are directed to an in-wheel motor and an in-wheel driving device which may be efficiently mounted in a limited internal space of a wheel.

In one embodiment, an in-wheel motor includes: a motor rotor installed inside a wheel of a vehicle; and a plurality of motor stators installed on the circumference of the motor rotor so as to be separated from each other, and forming magnetic fields to rotate the motor rotor.

The motor stators may be arranged at even intervals on the circumference of the motor rotor.

The motor stators may be arranged on the circumference of the motor rotor so as to be symmetrical with each other.

The motor rotor may include a permanent magnet, and the motor stator may include an electromagnet.

The motor rotor may include a magnetic material, and the motor stator may include an electromagnet.

In another embodiment, an in-wheel driving device includes: a motor rotor installed inside a wheel of a vehicle; a plurality of motor stators installed on the circumference of the motor rotor so as to be separated from each other, and forming magnetic fields to rotate the motor rotor; a motor cover covering the motor rotor and the motor stators; and a caliper connection connected to the motor cover in one of spaces formed between the respective stators and having a caliper fixed and installed thereon.

The motor rotor may include: a rotor shaft rotatably supported by a bearing; and a magnetic rotating body including a permanent magnet or magnetic material, coupled to the circumference of the rotor shaft, and rotated by the magnetic fields formed by the motor stators.

The motor stators may be arranged at even intervals on the circumference of the motor rotor.

The motor stators may be arranged on the circumference of the motor rotor so as to be symmetrical with each other.

The motor cover may include: a rotor cover portion covering an outer surface of the motor rotor; and a stator cover portion covering an outer surface of the motor stator.

An inner surface of the rotor cover portion may have a predetermined gap from the outer surface of the motor rotor.

An inner surface of the stator cover portion may have a predetermined gap from the outer surface of the motor stator.

The caliper connection may be formed in the rotor cover portion.

The motor cover may include: a motor housing portion which has a concave shape to house the motor rotor and the motor stators therein and through which a shaft portion of the rotor shaft passes; and a lid portion covering an opening of the motor housing portion and coupled to the motor housing portion.

The in-wheel driving device may further include a suspension system connection fixed and installed on the motor cover in another of the spaces formed between the respective motor stators, and connected to an end of the suspension system.

The caliper connection may be positioned in one of the plurality of spaces formed between the motor stators, and the suspension system connection may be positioned in another of the plurality of spaces formed between the motor stators.

The suspension system connection may be connected to a lower arm of a MacPherson strut suspension, and a strut of the MacPherson strut suspension may be fixed and installed on the motor cover.

The suspension system connection may be connected to a lower arm of a multi-link suspension, and an upper arm and an assist arm of the multi-link suspension may be fixed and installed on the motor cover.

A spindle mounting bracket of a coupled torsion beam axle (CTBA) suspension may be fixed and installed on the motor cover.

The in-wheel driving device may further include a steering system connection fixed and installed on the motor cover in another of the spaces formed between the motor stators and connected to an end of a steering system.

The caliper connection may be positioned in one of the plurality of spaces formed between the motor stators, and the steering system connection may be positioned in another of the plurality of spaces formed between the motor stators.

The in-wheel driving device may further include a decelerator reducing and outputting a rotational displacement of the motor rotor; and a hub bearing rotatably supporting an output shaft of the decelerator and fixed and installed on the motor cover.

The decelerator may include: a sun gear connected to the motor rotor, rotated on the same axis as the motor rotor, and having gear teeth formed on the outer circumference thereof; a ring gear having gear teeth formed on the inner circumference thereof and installed outside the sun gear so as to be separated from the sun gear; a plurality of planet gears installed between the sun gear and the ring gear and revolving and rotating in connection with rotation of the sun gear; and a carrier connected to the rotation centers of the respective planet gears, decelerated and rotated at a speed corresponding to the rotation of the planet gears, and having the output shaft formed in the rotation center thereof.

DESCRIPTION OF SPECIFIC EMBODIMENTS

Hereinafter, exemplary embodiments of the present invention will be described in detail with reference to the accompanying drawings.

The drawings are not necessarily to scale and in some instances, proportions may have been exaggerated in order to clearly illustrate features of the embodiments.

Furthermore, terms to be described below have been defined by considering functions in embodiments of the present invention, and may be defined differently depending on a user or operator's intention or practice. Therefore, the definitions of such terms are based on the overall descriptions of the present specification.

Figure 1:
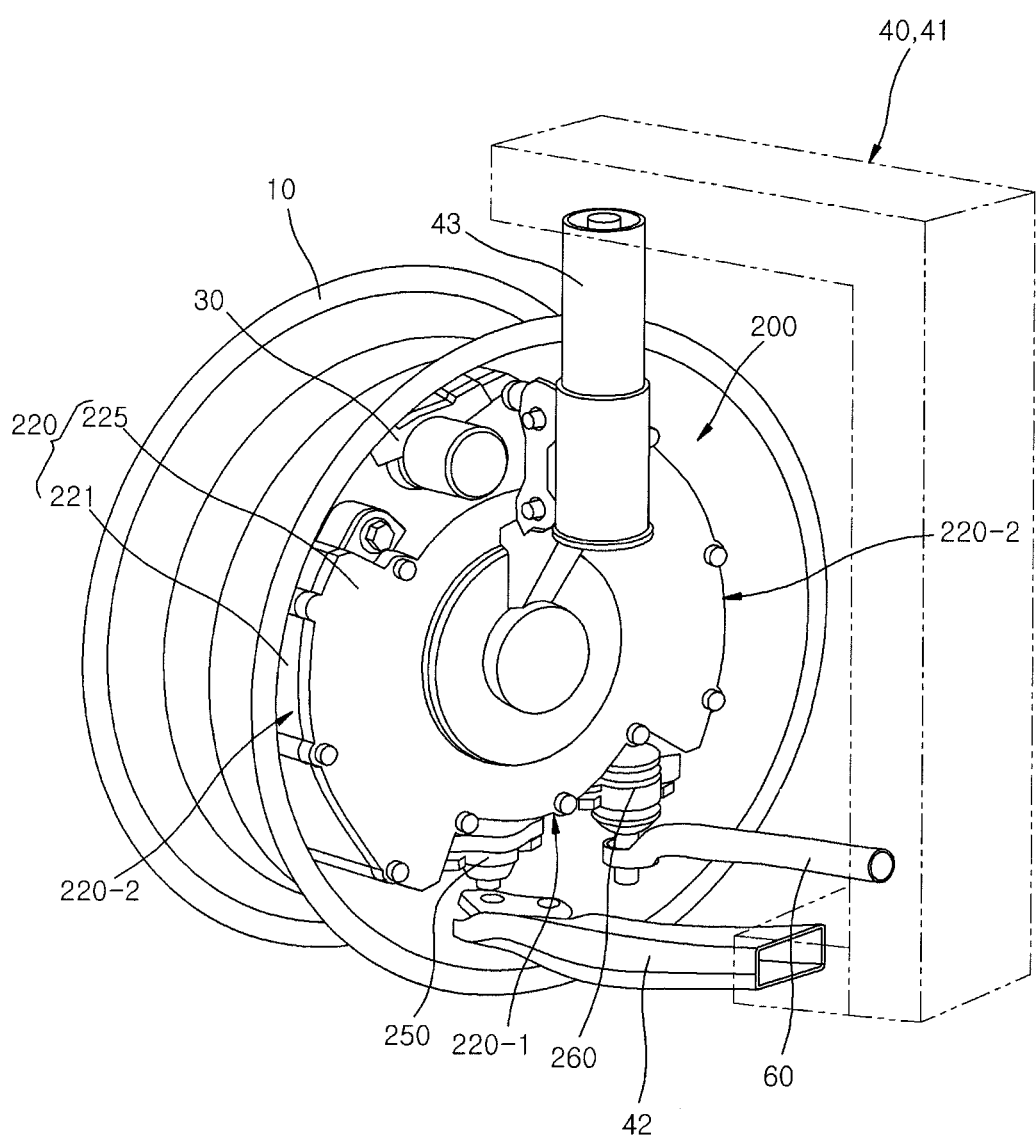
FIG. 1 is a perspective view illustrating an installation state of an in-wheel driving device in accordance with an embodiment of the present invention.
Figure 2:
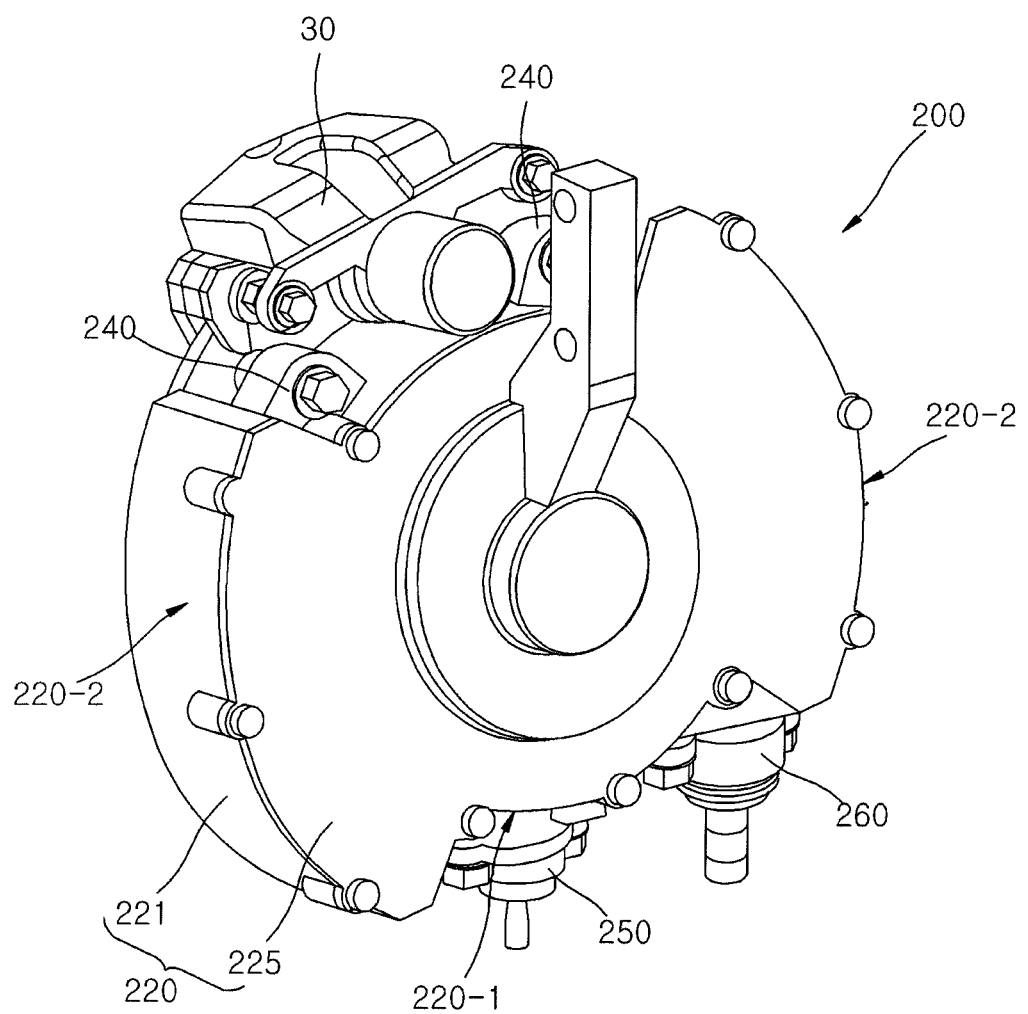
FIG. 2 is a perspective view illustrating a state in which a caliper is installed in the in-wheel driving device in accordance with the embodiment of the present invention.
Figure 3:
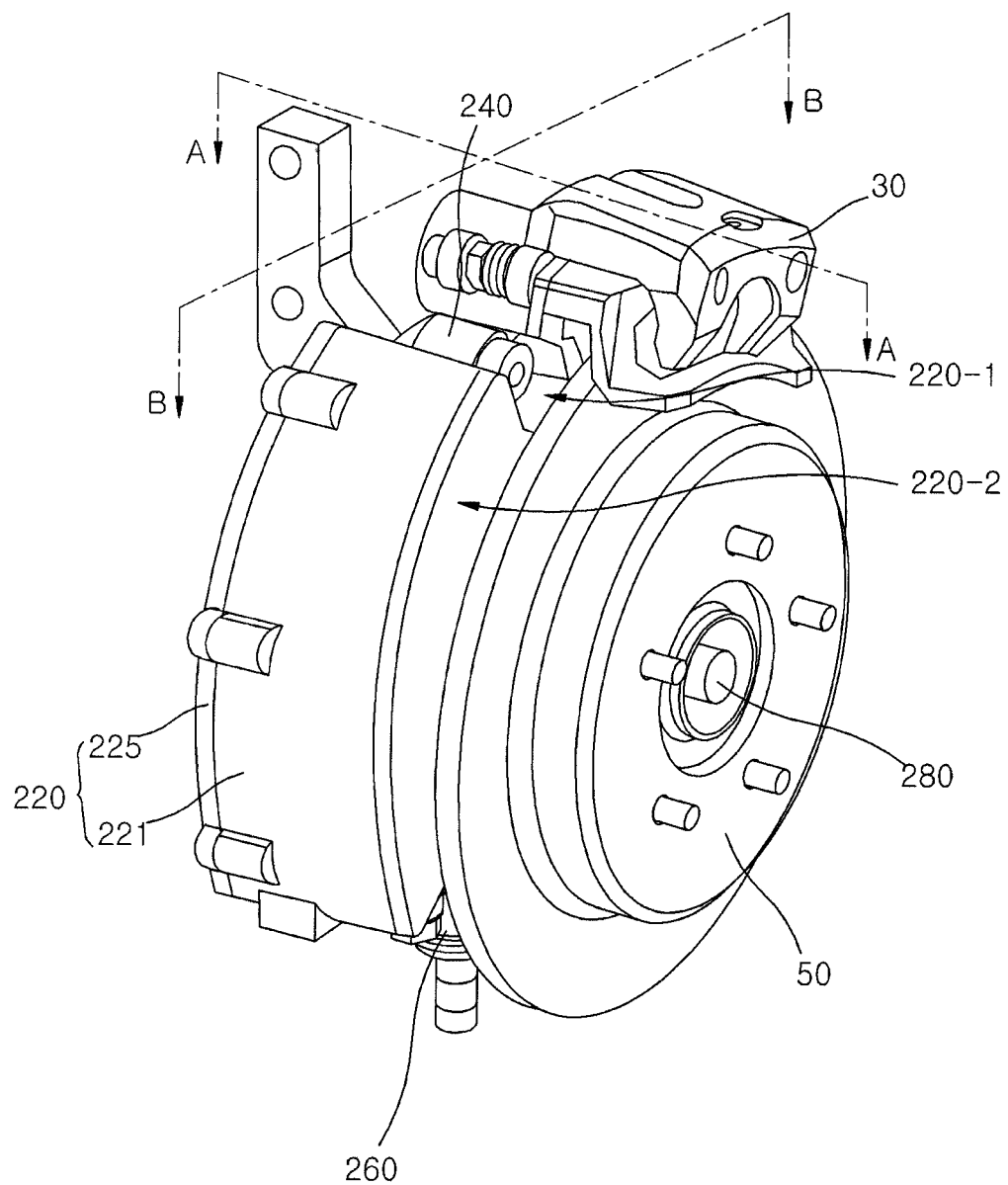
FIG. 3 is a perspective view illustrating the state in which the caliper is installed in the in-wheel driving device in accordance with the embodiment of the present invention, seen from another direction.

FIG. 1 is a perspective view illustrating an installation state of an in-wheel driving device in accordance with an embodiment of the present invention. FIGS. 2 and 3 are perspective views illustrating a state in which a caliper is installed in the in-wheel driving device in accordance with the embodiment of the present invention, seen from various directions.

Figure 4:
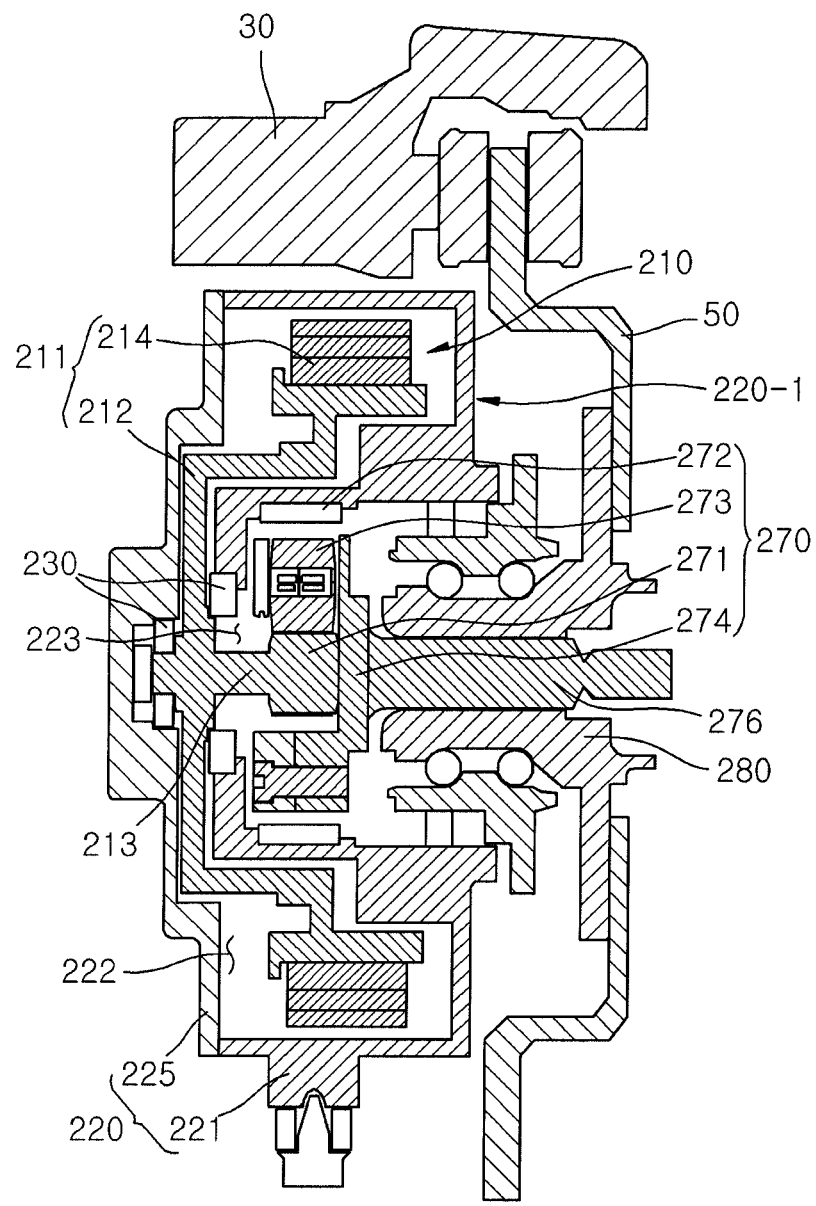
FIG. 4 is a cross-sectional view of the in-wheel driving device in accordance with the embodiment of the present invention, taken along line A-A of FIG. 3.
Figure 5:
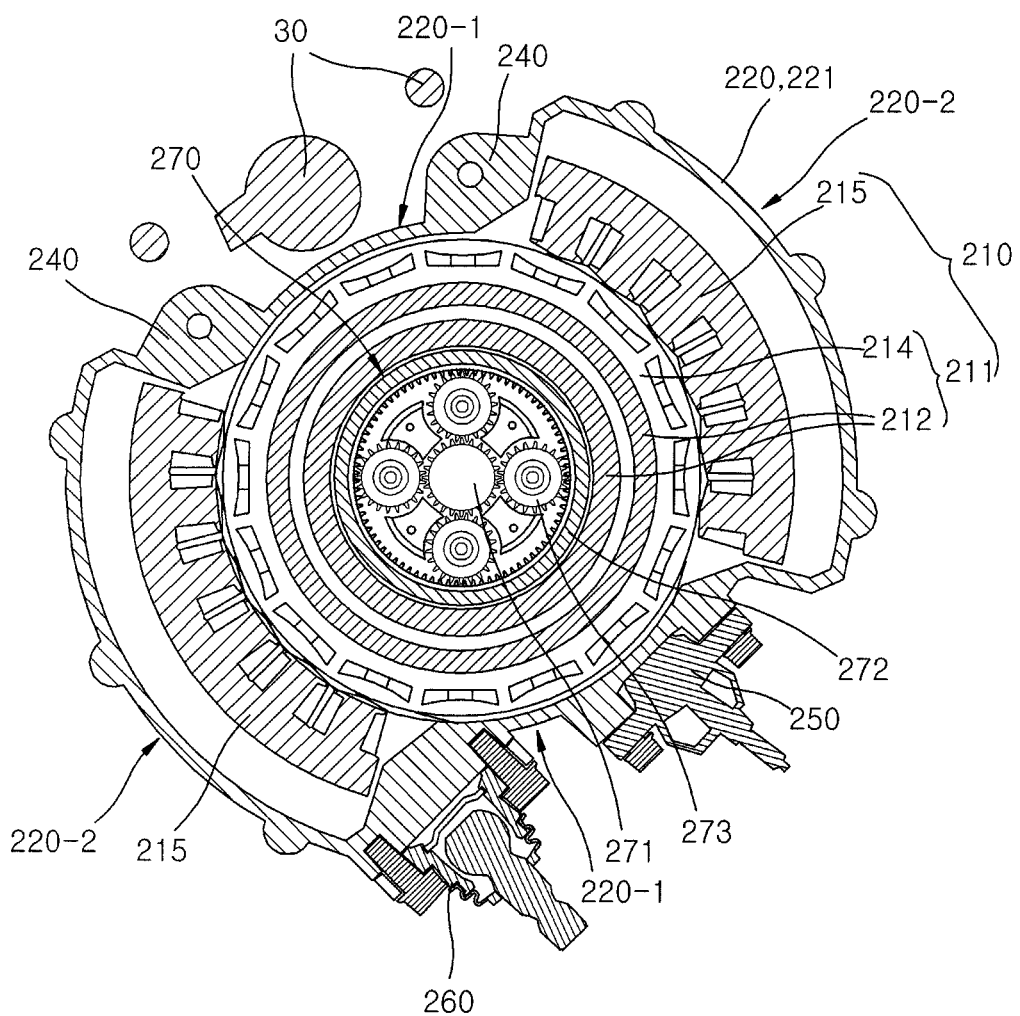
FIG. 5 is a cross-sectional view of the in-wheel driving device in accordance with the embodiment of the present invention, taken along line B-B of FIG. 3.

FIG. 4 is a cross-sectional view of the in-wheel driving device in accordance with the embodiment of the present invention, taken along line A-A of FIG. 3. FIG. 5 is a cross-sectional view of the in-wheel driving device in accordance with the embodiment of the present invention, taken along line B-B of FIG. 3.

Figure 6:
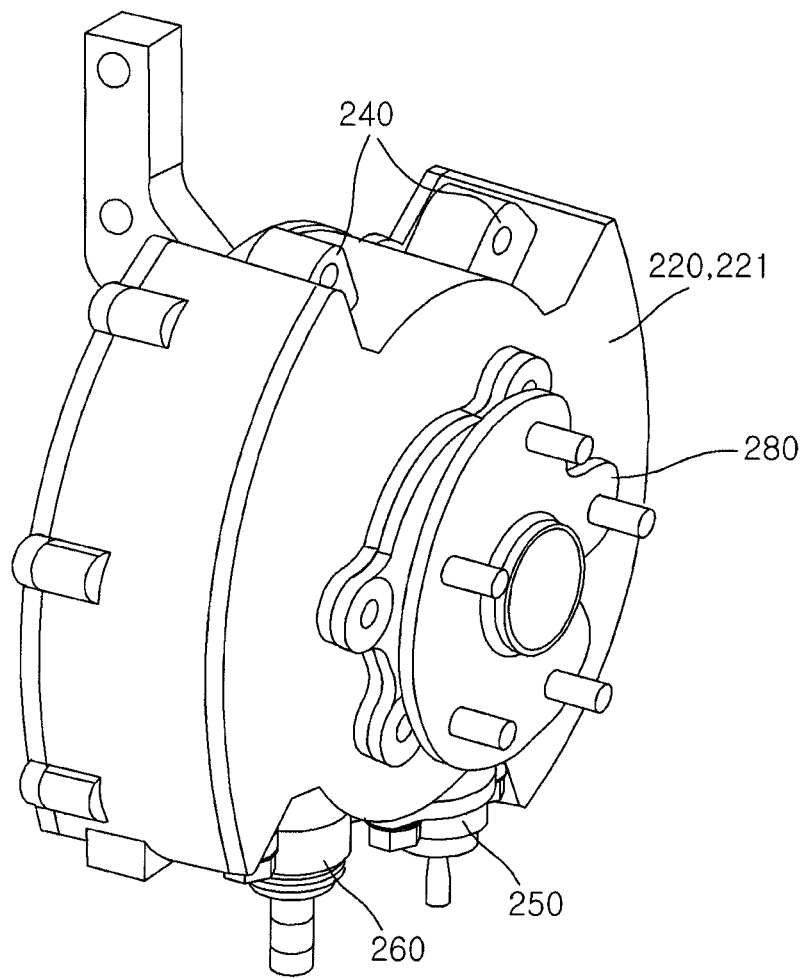
FIG. 6 is a perspective view of the in-wheel driving device in accordance with the embodiment of the present invention.
Figure 7:
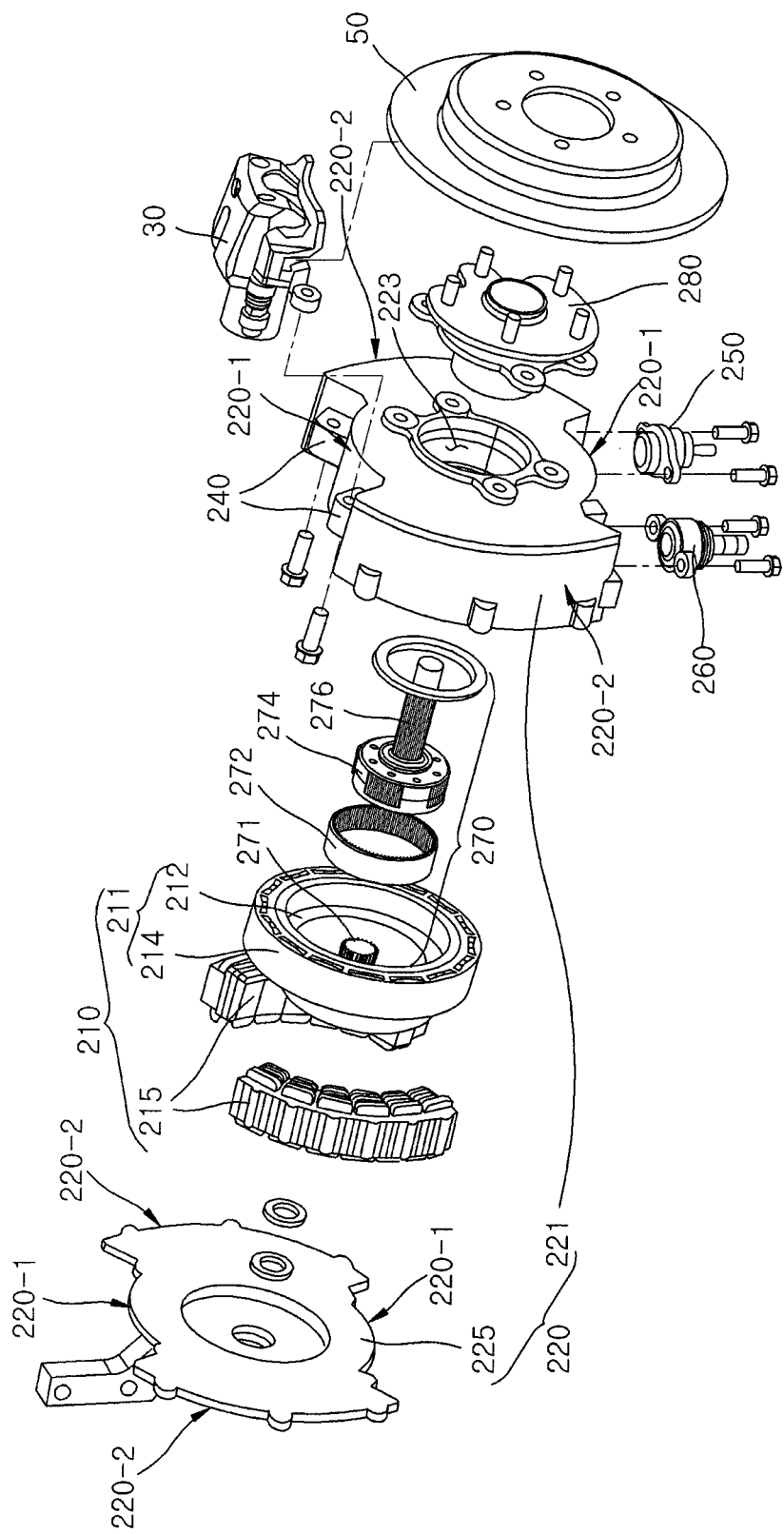
FIG. 7 is an exploded perspective view of the in-wheel driving device in accordance with the embodiment of the present invention.
Figure 8:
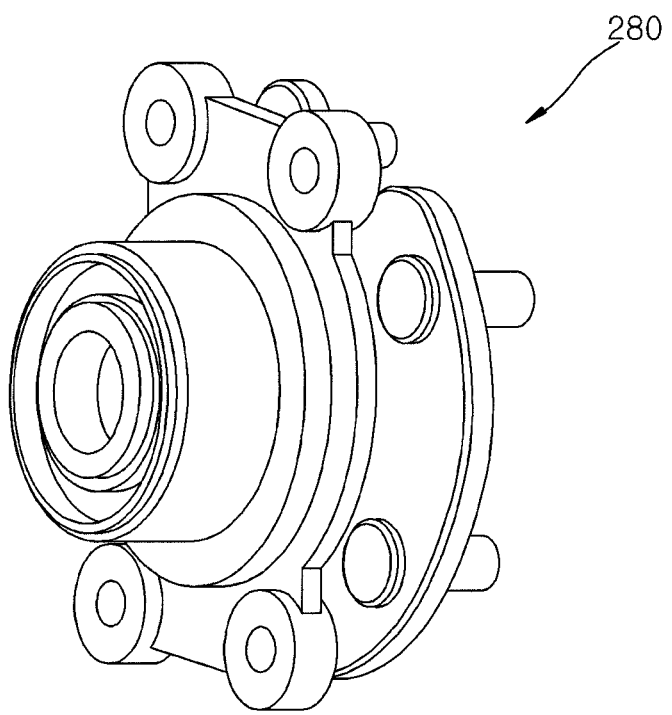
FIG. 8 is a perspective view of a hub bearing of the in-wheel driving device in accordance with the embodiment of the present invention.

FIG. 6 is a perspective view of the in-wheel driving device in accordance with the embodiment of the present invention. FIG. 7 is an exploded perspective view of the in-wheel driving device in accordance with the embodiment of the present invention. FIG. 8 is a perspective view of a hub bearing of the in-wheel driving device in accordance with the embodiment of the present invention.

Figure 9:
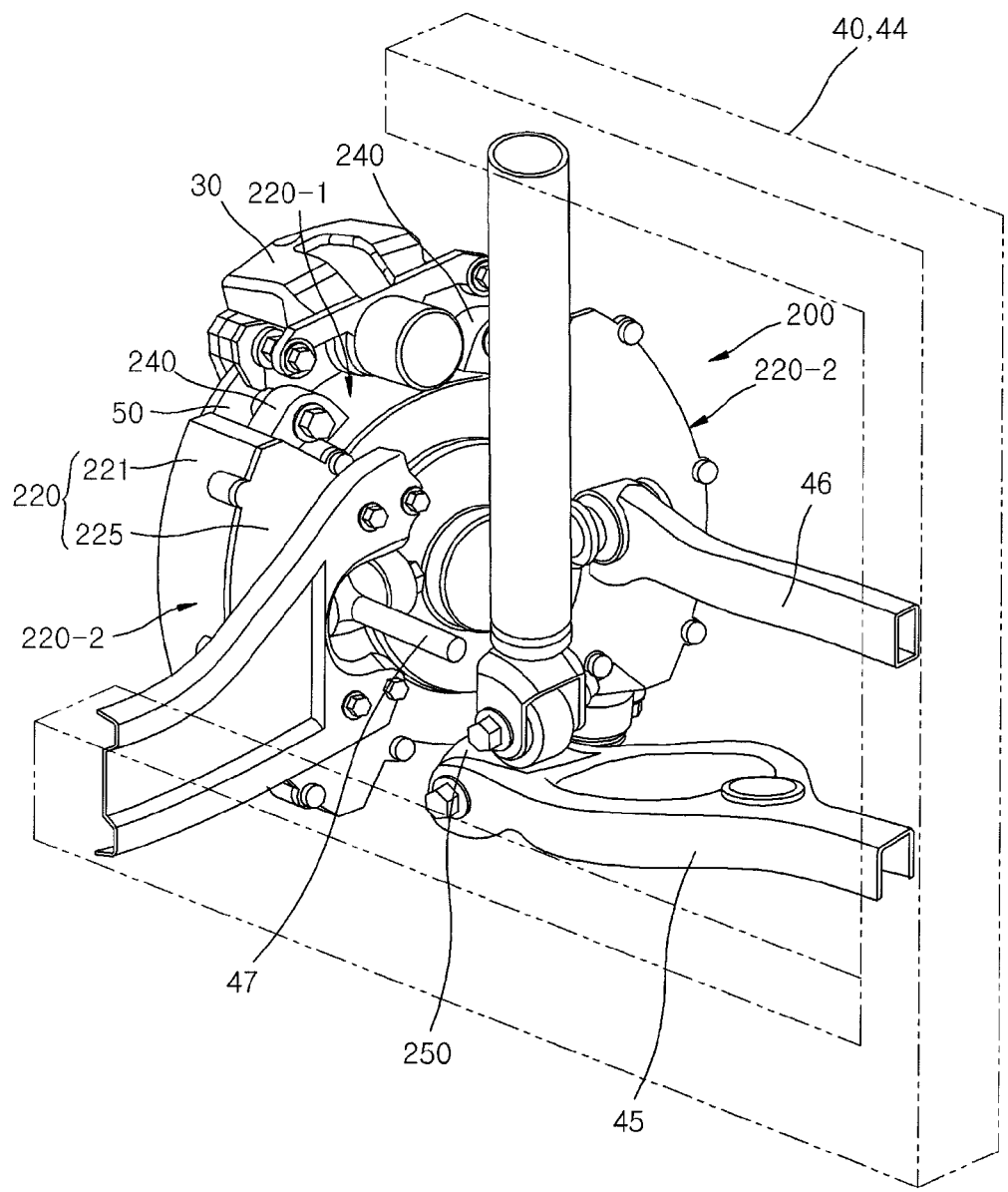
FIG. 9 is a perspective view illustrating an installation state of an in-wheel driving device in accordance with another embodiment of the present invention.
Figure 10:
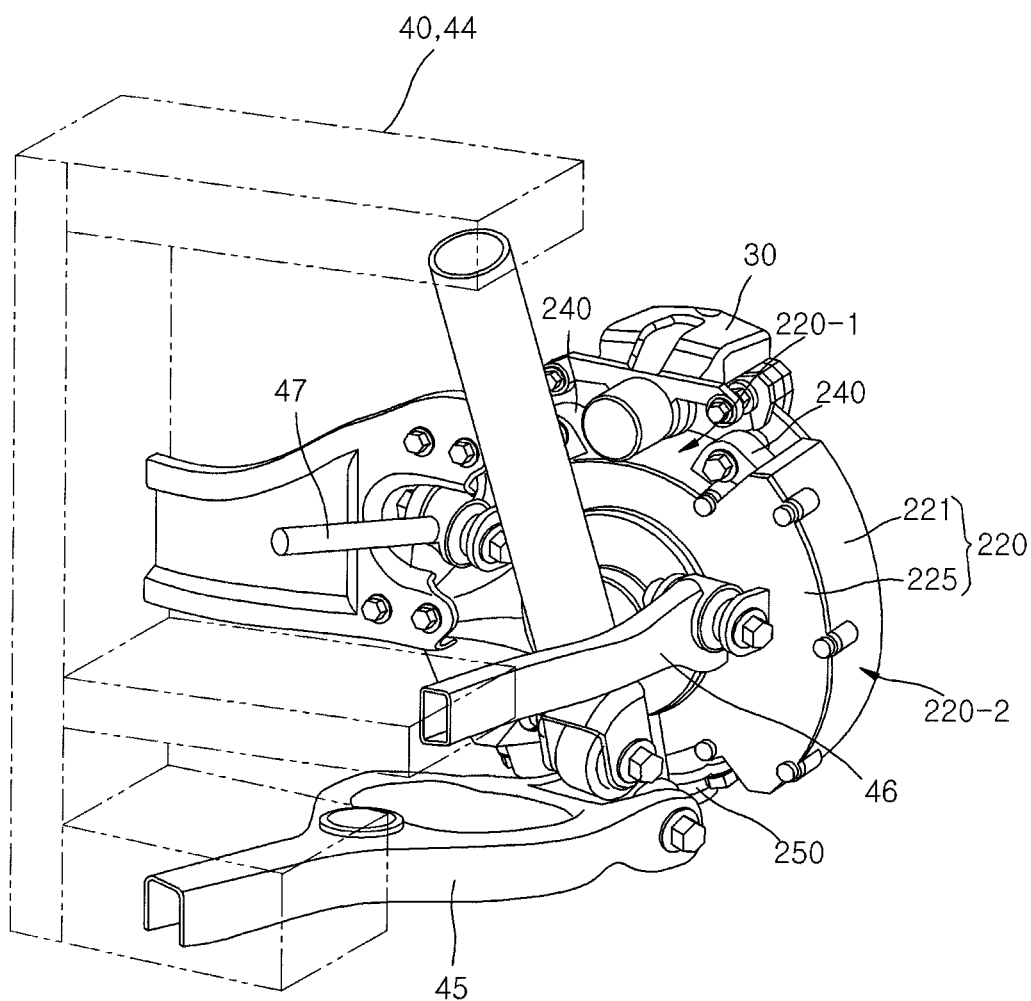
FIG. 10 is a perspective view illustrating the installation state of the in-wheel driving device in accordance with the embodiment of the present invention, seen from another direction.
Figure 11:
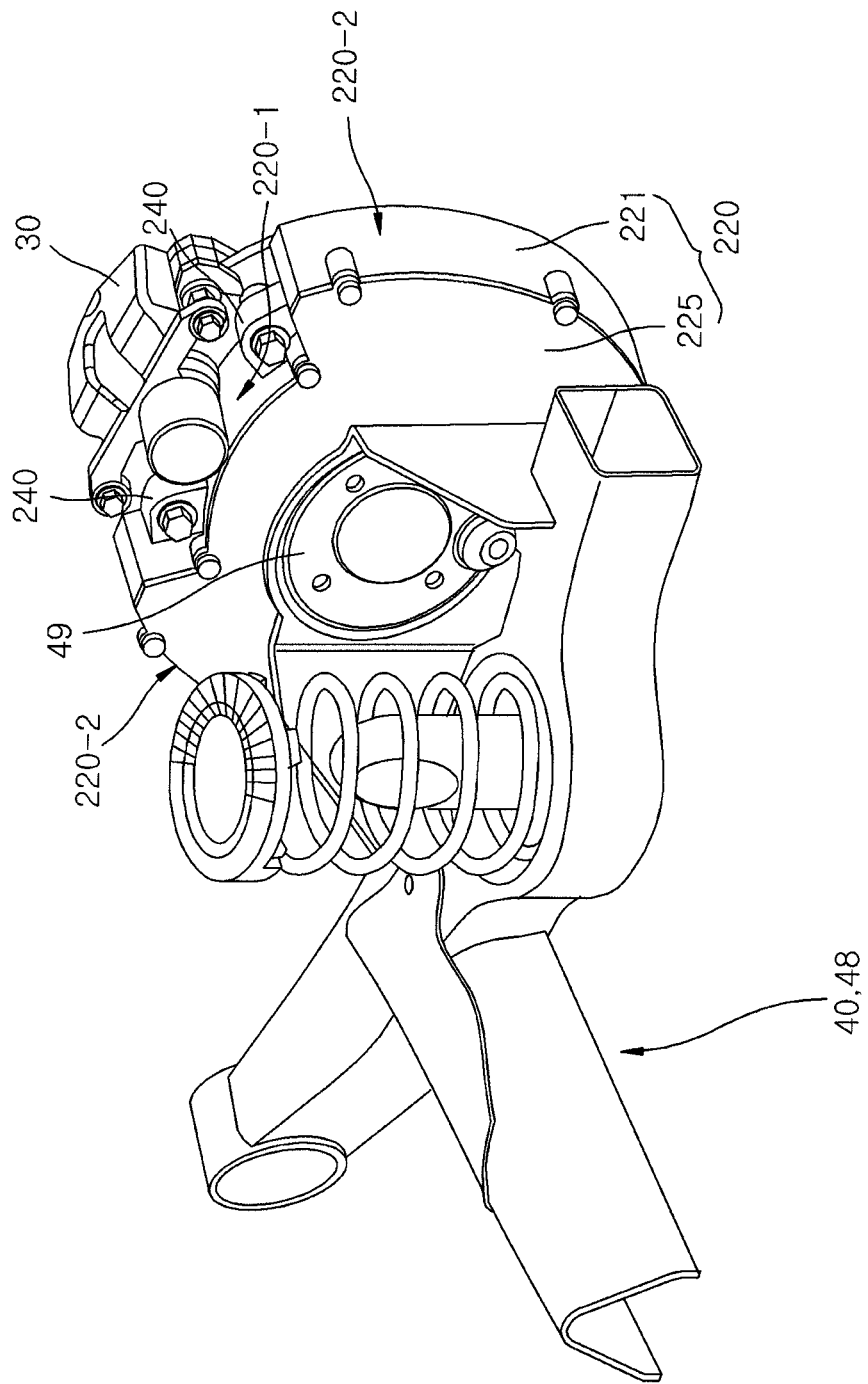
FIG. 11 is a perspective view illustrating an installation state of an in-wheel driving device in accordance with yet another embodiment of the present invention.

FIGS. 9 and 10 are perspective views illustrating an installation state of an in-wheel driving device in accordance with another embodiment of the present invention, seen from various directions. FIG. 11 is a perspective view illustrating an installation state of an in-wheel driving device in accordance with yet another embodiment of the present invention.

Referring to FIGS. 1 to 5, the in-wheel driving device 200 in accordance with the embodiment of the present invention includes a motor rotor 211, a plurality of motor stators 215, a motor cover 220, a caliper connection 240, a suspension system connection 250, a steering system connection 260, a decelerator 270, and a hub bearing 280.

The motor rotor 211 is rotated in place by the influence of magnetic fields formed by the motor stators 215.

Referring to FIGS. 4 and 5, the motor stator 211 includes a rotor shaft 212 and a magnetic rotating body 214. The rotor shaft 212 is rotatably supported by a bearing 230. The magnetic rotating body 214 includes a magnetic body such as a permanent magnet or metal and is coupled to the circumference of the rotor shaft 212. The magnetic rotating body 214 is rotated together with the rotor shaft 212 by the influence of the magnetic fields formed by the motor stator 215.

The rotor shaft 212 has a shaft portion 213 formed in the rotation center thereof. The shaft portion 213 is connected to the decelerator 270 which reduces the rotation displacement of the shaft portion 213 so as to increase torque.

The plurality of motor stators 215 are installed on the circumference of the motor rotor 211 so as to be separated from each other, and form the magnetic fields to rotate the motor rotor 211.

In a state where the in-wheel driving device 200 in accordance with the embodiment of the present invention is installed inside the wheel 10 as illustrated in FIG. 1, the motor rotor 211 is positioned on the same axis as the rotation center of the wheel 10, and the motor stators 215 are positioned between the motor rotor 211 and the wheel 10.

Referring to FIG. 5, a one side portion of the motor stator 215, positioned adjacent to the motor rotor 211, forms an arc-shaped curved surface corresponding to the circumference of the motor rotor 211. Hereafter, the one side portion is referred to as an inner surface portion.

The in-wheel driving device 200 in accordance with the embodiment of the present invention has a structure in which two motor stators 215 each having an arc-shaped inner surface portion corresponding to a 90-degree displacement in the circumference of the motor rotor 211 are installed at even intervals so as to be symmetrical with each other.

When the motor stators 215 are arranged at even intervals on the circumference of the motor rotor 211, the magnetic fields formed by the motor stators 215 are uniformly applied at even intervals across the entire circumference (360 degrees) of the motor rotor 211.

Accordingly, since the magnetic fields applied to the motor rotor 211 are not concentrated on one side, the rotation of the motor rotor 211 may be stably performed.

When a plurality of motor rotors 215 having the same shape are arranged at even intervals, the plurality of motor rotors 215 are symmetrical with respect to the rotation center of the motor rotor 211.

When a motor stators 215 having different shapes are symmetrically arranged on the circumference of the motor rotor 211; magnetic fields applied to the motor rotor 211 may be controlled to be concentrated on one side with respect to the symmetry.

When the motor rotor 211 and the motor stator 215 are configured to include a permanent magnet and an electromagnet, respectively, it is possible to implement a brushless DC (BLDC) motor or permanent magnet synchronous motor (PMSM) structure.

Alternatively, when the motor rotor 211 and the motor stator 214 are configured to include a magnetic material such as metal and an electromagnet, respectively, it is possible to implement an induction motor or switched reluctance motor (SRM) structure.

The operation and principle in which the magnetic fields are formed through the motor stators 215 so as to rotate the motor rotor 211 and specific components for implementing the operation and principle are based on the well-known technology of the motor field. Therefore, the detailed descriptions thereof are omitted herein.

The motor cover 220 covers the motor rotor 21 and the motor stators 215, and provides a space to house the motor rotor 211 and the plurality of motor stators 215.

Referring to FIGS. 2, 4, and 5, the motor cover 220 in accordance with the embodiment of the present invention includes a motor housing portion 221 and a lid portion 225.

The motor housing portion 221 has a concave shape to house the motor rotor 211 and the motor stators 215 therein. The motor housing portion 221 has a hole 223 through which the shaft portion 213 of the rotor shaft 212 of the motor rotor 211 housed in the motor housing portion 221 passes.

The lid portion 225 covers an opening 222 (refer to FIG. 4) of the motor housing portion 221, and is coupled to the motor housing portion 221.

In the hole 223 formed in the motor housing portion 221 and a concave groove of the lid portion 225, formed at a position corresponding to the rotation center of the rotor shaft 212, a plurality of bearings 230 are installed to rotatably support the rotor shaft 212.

The motor rotor 211 may maintain a state in which the motor rotor 211 is stably installed inside the motor cover 220 with a gap from the inner surface of the motor cover 220 through the bearings 230, without interference.

The motor cover 220 covers the outer surfaces of the motor stators 215 arranged on the circumference of the motor rotor 211 and a part of the outer surface of the motor rotor 211, which is not covered by the motor stators 215.

In the following descriptions, a portion of the motor cover 220 which covers the outer surface of the motor rotor 211 is referred to as a rotor cover portion 220-1, and a portion of the motor cover 220 which covers the outer surface of the motor stator 215 is referred to as a stator cover portion 220-2.

Referring to FIG. 5, the rotor cover portion 220-1 and the stator cover portion 220-2 in accordance with the embodiment of the present invention are integrated with each other while successively extended along the outer surfaces of the motor rotor 211 and the motor stators 215.

The inner surface of the rotor cover portion 220-1 has a predetermined gap from the outer surface of the motor rotor 211. Furthermore, the inner surface of the stator cover portion 220-2 has a predetermined gap from the outer surface of the motor stator 215, like the rotor cover portion 220-1.

Here, the predetermined gap not only may indicate one numerical vale (for example, 2 mm), but also may indicate a gap range (for example, 2 mm to 2 cm).

Referring to FIG. 5, the rotor cover portion 220-1 and the stator cover portion 220-2 may have different gaps from the outer surfaces of the motor rotor 211 and the motor stator 215, respectively.

In this embodiment of the present invention, the rotor cover portion 220-1 and the stator cover portion 220-2 have the predetermined gaps from the outer surfaces of the motor rotor 211 and the motor stator 215, respectively. However, the motor cover 220 in accordance with the embodiment of the present invention is not limited thereto.

The motor cover 220 in accordance with the embodiment of the present invention may be modified in various manners. For example, only one of the rotor cover portion 220-1 and the stator cover portion 220-2 may have a predetermined gap from the outer surface of the motor rotor 211 or the motor stator 215.

The caliper connection 240 is formed on the rotor cover portion 220-1 of the motor cover 220 between the motor stators 215 which are arranged on the circumference of the motor rotor 211 so as to be separated from each other.

Referring to FIG. 2, the caliper connection 240 in accordance with the embodiment of the present invention has a coupling hole formed therein, and a coupling member for coupling the caliper 30 passes through the coupling hole.

The suspension system connection 250 is fixed and installed on the rotor cover portion 220-1 of the motor cover 220 in the space formed between the motor stators 215, like the caliper connection 240.

Referring to FIG. 6, the suspension system connection 250 in accordance with the embodiment of the present invention has a ball joint structure which is easily coupled to an end of the suspension system 40 which performs a rotating operation.

The steering system connection 260 is fixed and installed on the rotor cover portion 220-1 of the motor cover 220 in the space formed between the motor stators 215, like the suspension system connection 250.

Referring to FIG. 6, the suspension system connection 260 in accordance with the embodiment of the present invention has a ball joint structure which is easily coupled to an end of the steering system 60 which performs a rotating operation.

Referring to FIG. 1, the brake system including the caliper 30, the end of the suspension system 40, and the end of the steering system 60 are assembled and coupled to the caliper connection 240, the suspension system connection 250, and the steering system connection 260, respectively.

When the plurality of motor stators 215 are arranged on the circumference of the motor rotor 211 so as to be separated from each other, a space corresponding to the space between the motor stators 215 is formed between the rotor cover portion 220-1 and the wheel 10.

In the embodiment of the present invention, the caliper connection 240 is formed on the rotor cover portion 220-1 in one of the plurality of spaces formed between the motor stators 215.

The caliper 30 is connected to the caliper connection 240 in the space formed between the rotor cover portion 220-1 and the wheel 10.

The suspension system connection 250 and the steering system connection 260 are formed on the rotor cover portion 220-1 in another of the plurality of spaces formed between the motor stators 215.

The ends of the suspension system 40 and the steering system 60 are connected to the suspension system connection 250 and the steering system connection 260, respectively, in different spaces formed between the rotor cover portion 220-1 and the wheel 10.

FIG. 1 illustrates an example in which a MacPherson strut suspension 41 serving as the suspension system 40 is applied to a front wheel.

The MacPherson strut suspension 41 is typically applied to a front wheel. In the case of the front wheel, the steering system 60 may be additionally coupled to the wheel 10, in addition to the brake system and the suspension system 40.

As a lower arm 42 of the MacPherson strut suspension 41 is connected to the suspension system connection 250 and the steering system 60 is connected to the steering system connection 260 positioned in the same space as the suspension system connection 250, it is possible to implement a MacPherson strut suspension structure.

Among components forming the MacPherson strut suspension 41, a component such as a strut 43, which is not rotationally driven but fixed and installed on the wheel 10, may be fixed and installed at a proper position of the motor cover 220.

The decelerator 270 reduces and outputs the rotational displacement of the motor rotor 211.

Referring to FIGS. 4, 5, and 7, the decelerator 270 in accordance with the embodiment of the present invention includes a sun gear 271, a ring gear 272, a plurality of planet gears 273, and a carrier 274.

The sun gear 271 is connected to the shaft portion 213 of the rotor shaft 212 so as to be rotated on the same axis as the motor rotor 211, and has gear teeth formed on the outer circumference thereof. The ring gear 273 has gear teeth formed on the inner circumference thereof and is installed outside the sun gear 271 so as to be separated from the sun gear 271. The planet gears 273 are installed between the sun gear 271 and the ring gear 272, and rotate and revolve in connection with the rotation of the sun gear 271. The carrier 274 is connected to the rotation centers of the planet gears 273, and decelerates and rotates at a speed corresponding to the rotation of the planet gears 273. The carrier 274 has an output shaft 286 formed in the rotation center thereof.

The decelerator 270 performs the deceleration control through a planetary gear train structure in which the sun gear 271, the ring gear 272, and the planetary 273 are arranged while forming a concentric circle.

When the ring gear 272 is fixed and the sun gear 271 is rotationally driven, the carrier 274 connected to the plurality of planetary gears 273 is decelerated and rotated in the same direction as the sun gear 271.

Referring to FIGS. 4, 7, and 8, the hub bearing 280 rotatably supports the output shaft 276 of the decelerator 270, and is fixed and installed on the motor cover 220.

The motor cover 220 is fixed and installed on the wheel 10, and the hub bearing 280 is fixed and installed on the motor cover 220. The hub bearing 280 is coupled to a brake disk 50, and the caliper 30 is installed on the caliper connection 240 so as to have a displacement toward the brake disk 50.

Accordingly, when the brake system is operated, the caliper 30 brakes the wheel 10 while pushing a brake pad toward the brake disk 50.

The sun gear 271 positioned at one side of the decelerator 270 is rotatably supported by the bearings 230 to support the rotor shaft 212, and the carrier 274 positioned at the other side of the decelerator 270 is rotatably supported by the hub bearing 280.

The decelerator 270 may be rotated in place while maintaining a state in which the decelerator 270 is stably supported by the plurality of bearing members including the bearings 230 and the hub bearing 280.

FIGS. 9 and 10 illustrate an example in which a multi-link suspension 44 serving as the suspension system 40 is applied to a rear wheel. In this case, the steering system connection 260 for coupling the steering system 60 is not formed, unlike the case in which the MacPherson strut suspension 41 is applied As the lower arm 45 of the multi-link suspension 44 is connected to the suspension system connection 250 in a space where the caliper 30 is not installed among the plurality of spaces formed between the rotor cover portion 220-1 and the wheel 10, it is possible to implement a multi-link suspension structure.

Among the components forming the multi-link suspension 44, components such as an upper arm 46 and an assist arm 47 may be fixed and installed at proper positions of the motor cover 220.

FIG. 11 is a diagram illustrating an example in which a coupled torsion beam axle (CTBA) suspension 48 serving as the suspension system 40 is applied to the rear wheel.

As a spindle mounting bracket 49 is fixed and installed on one surface of the motor cover 220 without interfering with the caliper 30, it is possible to simply implement the CTBA suspension 48.

In the in-wheel driving device 200 having the above-described structure in accordance with the embodiment of the present invention, the plurality of motor stators 215 are arranged on the circumference of the motor rotor 211 so as to be separated from each other. Therefore, the plurality of spaces in which other components of the vehicle are installed may be formed between the motor rotor 211 and the wheel 10.

Furthermore, vehicle components connected to the wheel 10 of the vehicle, such as the brake system, the suspension system 40, and the steering system 60, may be freely arranged in the plurality of spaces formed between the motor rotor 211 and the wheel 10.

That is, the size of the in-wheel motor 210 including the motor rotor 211 and the motor stators 215 does not need to be reduced or the size of the wheel 10 does not need to be increased, but the motor rotor 211, the motor stators 215, the brake system, the suspension system 40, and the steering system 60 may be efficiently mounted in the limited internal space of the wheel 10.

Furthermore, the plurality of spaces formed between the motor rotor 211 and the wheel 10 may be used to apply various specifications such as the MacPherson strut suspension applied to the front wheel, the multi-link suspension applied to the rear wheel, and the CTBA suspension.

Furthermore, the in-wheel motor 210 having a size corresponding to the wheel 10 may be applied to implement a significant increase in torque, compared to a case in which the size of the in-wheel motor is reduced to a size corresponding to the motor rotor 211.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A vehicle wheel with an in-wheel motor, comprising:
a vehicle wheel comprising a hole with an inner circumference;
a motor installed inside the hole of the vehicle wheel, the motor comprising a stator and a rotor;
the rotor comprising a ring shape and rotatable about an axis;
the stator comprising a first arcuate stator block and a second arcuate stator block; and
a motor housing comprising a first rotor segment, a first stator segment, a second rotor segment and a second stator segment arranged in order along an angular direction about the axis such that the first and second stator segments are opposingly arranged about the axis,
wherein the first stator segment houses the first arcuate stator block and the second stator segment houses the second stator block such that the first and second arcuate stator blocks are opposingly arranged about the axis,
wherein the first and second rotor segments radially smaller than the first and second stator segments such that the motor housing provides:
a first space that is that radially beyond the first rotor segment and angularly between the first and second stator segment, and
a second space that is radially beyond the second rotor segment and angularly between the first and second stator segments.

2. The in-wheel motor of claim 1, wherein the first and second stator segments extend about the same angular distance about the axis, wherein the first and second arcuate blocks are diagonally symmetrically arranged about the axis.

3. The in-wheel motor of claim 1, wherein the first and second spaces extend about the same angular distance about the axis.

4. The in-wheel motor of claim 1, wherein the rotor comprises a permanent magnet, and the stator comprises an electromagnet.

5. The in-wheel motor of claim 1, wherein the rotor comprises a magnetic material, and the stator comprises an electromagnet.

6. An in-wheel driving device comprising:
a motor installed inside a wheel of a vehicle, the motor comprising a rotor and a stator;
the rotor rotatable about an axis;
the stator comprising a first arcuate stator block and a second arcuate stator block
a motor housing comprising a first rotor segment, a first stator segment, a second rotor segment and a second stator segment arranged in order along an angular direction about the axis such that the first and second stator segments are opposingly arranged about the axis,
wherein the first stator segment houses the first arcuate stator block and the second stator segment houses the second arcuate stator block such that the first and second arcuate stator blocks arr opposingly arranged about the axis,
wherein the first and second rotor segments radially smaller than the first and second stator segments such that the motor housing provides:
a first space that is radially beyond the first rotor segment and angularly between the first and second stator segment, and
a second space that is radially beyond the second rotor segment and angularly between the first and second stator segments;
a caliper connection configured to connect to a caliper and fixed to one of the first and second rotor segments.

7. The in-wheel driving device of claim 6, wherein the rotor comprises:
a rotor shaft; and
a rotating body comprising, a permanent, magnet or magnetic material, coupled to the rotor shaft.

8. The in-wheel driving device of claim 7, wherein first and second stator segments extend about the same angular distance about the axis.

9. The in-wheel driving device of claim 7, wherein the first and second spaces extend about the same angular distance about the axis.

10. The in-wheel driving device of claim 6, wherein the first and second arcuate blocks are diagonally symmetrically arranged about the axis.

11. The in-wheel driving device of claim 10, wherein the first rotor segment faces a portion of the rotor with a predetermined gap therebetween.

12. The in-wheel driving device of claim 10, wherein an inner surface of the first stator segment has a predetermined gap from the first arcuate stator block.

13. The in-wheel driving device of claim 7, further comprising a motor housing lid configured to be placed over the motor housing, wherein the motor housing lid comprises a first rotor edge, a first stator edge, a second rotor edge, a second stator edge that are arranged in order along an angular direction about the axis when placed over the motor housing.

14. The in-wheel driving device of claim 6, further comprising a suspension system connection configured to connect to a suspension system and fixed to one of the first and second rotor segments.

15. The in-wheel driving device of claim 14, wherein the caliper connection is fixed to the first rotor segment, and the suspension system connection is fixed to the second rotor segment.

16. The in-wheel driving device of claim 14, wherein the suspension system connection is configured to connect to a lower arm of a MacPherson strut suspension, and a strut of the MacPherson strut suspension is fixed to the motor housing.

17. The in-wheel driving device of claim 14, wherein the suspension system connection is configured to connect to a lower arm of a multi-link suspension, and an upper arm and an assist arm of the multi-link suspension are fixed to the motor housing.

18. The in-wheel driving device of claim 14, wherein a spindle mounting bracket of a coupled torsion beam axle (CTBA) suspension is fixed to the motor housing.

19. The in-wheel driving device of claim 6, further comprising a steering system connection fixed to one of the first and second rotor segments and configured to connect to a steering system.

20. The in-wheel driving device of claim 19, wherein the caliper connection is fixed to the first rotor segment, and the steering system connection is fixed to the second rotor segment.

21. The in-wheel driving device of claim 6, further comprising:
a decelerator; and
a hub hearing rotatably supporting an output shaft of the decelerator and fixed to the motor housing.

22. The in-wheel driving device of claim 21, wherein the decelerator comprises:
- a sun gear connected to the rotor and rotatable about the axis, the sun gear having gear teeth formed on an outer circumference thereof;
- a ring gear having gear teeth formed on an inner circumference thereof and installed outside the sun gear;
- a plurality of planet gears installed between the sun gear and the ring gear; and
- a carrier connected to rotation centers of the planet gears and configured to rotate at a speed corresponding to rotation of the planet gears.

* * * * *